United States Patent [19]
Mackenzie

[11] 3,739,275
[45] June 12, 1973

[54] WEATHERPROOF ELECTRICAL METER

[75] Inventor: Elbert K. Mackenzie, North Wales, Pa.

[73] Assignee: Electro-Mechanical Instrument Co., Inc., Perkasie, Pa.

[22] Filed: June 28, 1971

[21] Appl. No.: 157,441

Related U.S. Application Data

[62] Division of Ser. No. 832,924, June 3, 1969, Pat. No. 3,638,119.

[52] U.S. Cl. .............................................. 324/156
[51] Int. Cl. ............................................. G01r 1/04
[58] Field of Search ..................... 324/156; 174/50, 174/58

[56] References Cited
UNITED STATES PATENTS

| | | | |
|---|---|---|---|
| 2,581,734 | 1/1952 | Triplett | 324/156 |
| 2,866,940 | 12/1958 | Lamb | 324/156 |
| 1,542,600 | 6/1925 | Boecher | 174/50 X |
| 2,425,250 | 8/1947 | Lamb | 324/156 UX |

*Primary Examiner*—Alfred E. Smith
*Attorney*—Woodcock, Washburn, Kurtz & Mackiewicz

[57] ABSTRACT

In an industrial type electrical meter, a transparent molded plastic bezel has molded index grooves in the periphery thereof so that the meter can be mounted in an indexed bracket in one of several mounting positions without use of tools. The The meter leads extend through an independently attached mounting fitting which is secured to the case by screws extending into blind holes in the case. The meter has spring-loaded, insulated shield encased, hand assembled, polarized connectors for connecting the meter into an electrical circuit without the use of tools.

6 Claims, 7 Drawing Figures

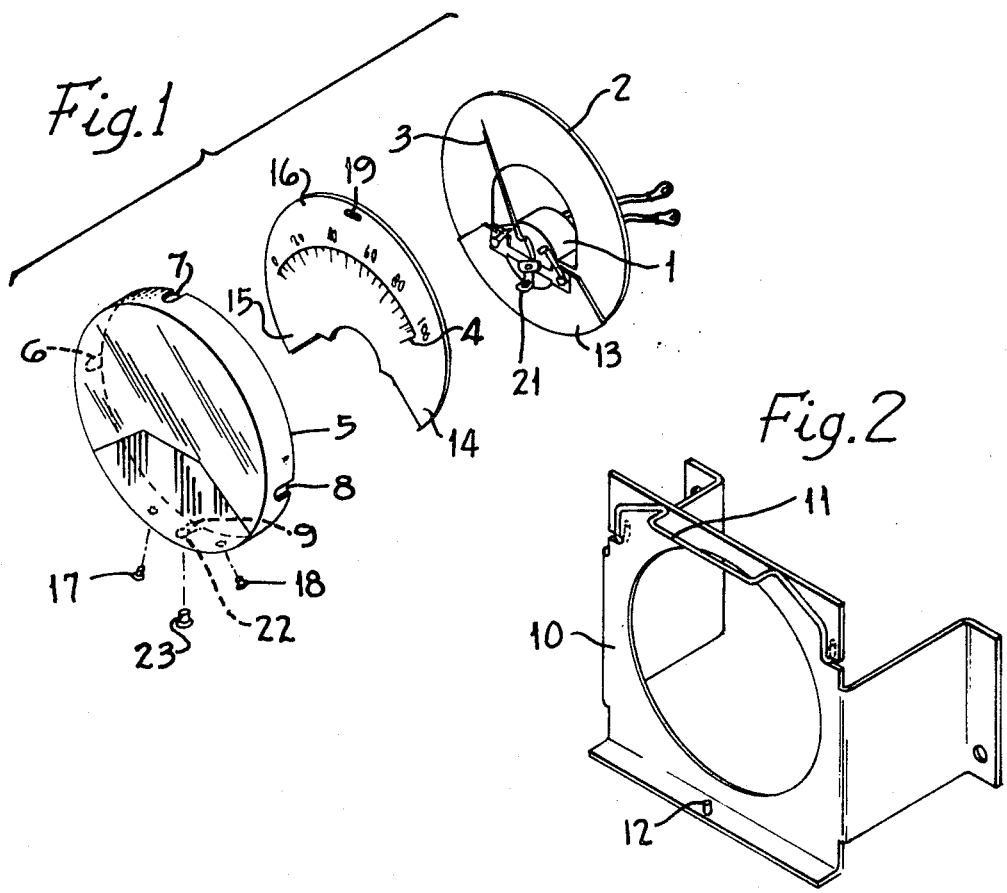
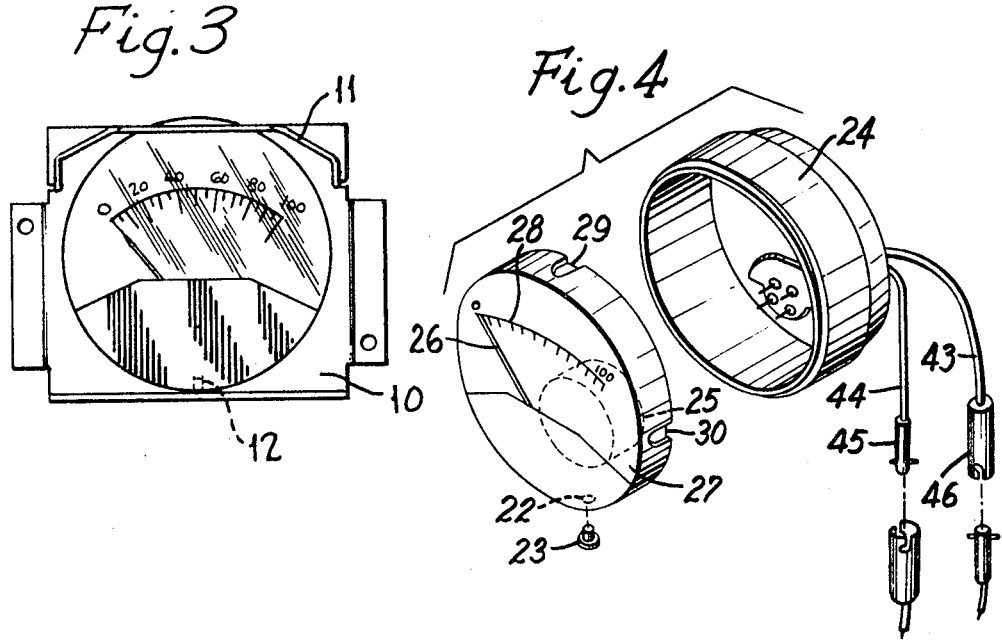

3,739,275

WEATHERPROOF ELECTRICAL METER

This application is a division of application Ser. No. 832,924, filed June 13, 1969. and now U.S. Pat. No. 3,638,119.

BACKGROUND OF THE INVENTION

This invention relates to industrial type electrical meters and more particularly to electrical meters which can be quickly and easily installed.

Electrical meters for industrial type applications must be extremely rugged in service. For example, in chemical processing plants or oil refineries an extremely large number of meters are provided to monitor system parameters. The moving magnet type of meter has desirable characteristics for these applications. Examples of moving magnet type meters suitable for use in industrial applications are shown in U. S. Pat. Nos. 2,970,267, Pfeffer; 3,094,659, Pfeffer; and 3,200,332, Pfeffer.

In addition to being rugged and low cost, moving magnet meters provide high overload security because there are no current carrying moving parts. The overload security is much higher than that of moving coil meters.

In industrial applications using a large number of meters, installation and maintenance of the meters is a large problem. Often, skilled electricians or electronics technicians install or replace meters in the electrical circuits.

Another problem in industrial applications is that dirt, dust, condensation and humidity often adversely affect the accuracy, and even the operability, of the meter.

SUMMARY OF THE INVENTION

It is an object of the present invention to provide an electrical meter with a transparent plastic bezel having molded index grooves in the periphery thereof for mounting in one of several positions in an indexed bracket without the use of tools.

It is another object of the present invention to provide a weatherproof meter normally permanently sealed and having a seal which can be opened without destroying the meter.

It is another object of the present invention to provide a weatherproof meter having a dessicant sealed therein to prevent fogging of the dial face from internal moisture and to prevent corrosion of the meter parts from trapped, internal moisture.

It is another object of the present invention to provide a self-contained meter case having a fitting suitable for mounting the meter directly on a conduit without the use of a bracket, panel, or auxiliary enclosure.

It is another object of the present invention to provide an industrial meter with a concealed external zero adjustment to protect suppressed zero settings.

It is another object of the present invention to provide an electrical meter with easily assembled, polarized, connectors on the meter leads.

DESCRIPTION OF THE DRAWINGS

FIG. 1 shows an exploded view of the meter;
FIG. 2 shows one form of the bracket;
FIG. 3 shows a front view of the meter mounted in the bracket of FIG. 2;
FIG. 4 shows a weatherproof meter.

DESCRIPTION OF A PARTICULAR EMBODIMENT

Figure 5:
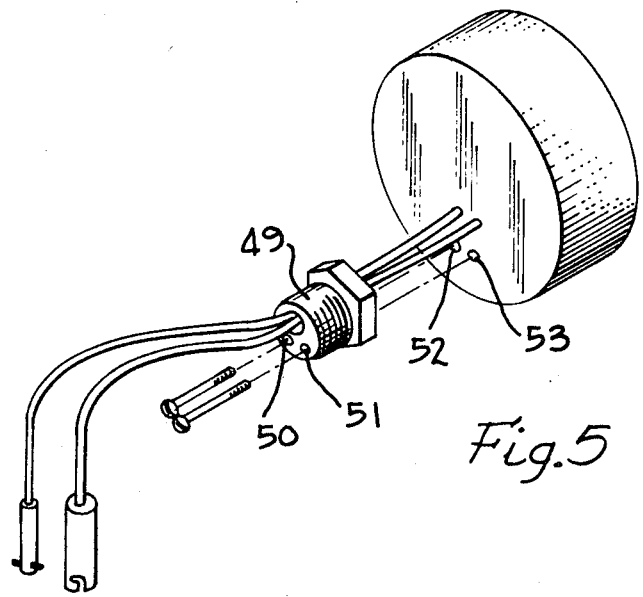
FIG. 5 shows one form of the independently attached mounting fitting.

Referring to FIG. 1, the meter includes a moving magnet movement 1 positioned in a flanged case 2. The movement drives a pointer 3 over the scale 4. A transparent molded plastic bezel 5 is attached to the case 2 to completely enclose the meter. The transparent bezel 5 and the opaque case 2 are constructed of a high strength polycarbonate plastic, referred to as Lexan by one supplier.

The bezel 5 has four index grooves 6 – 9 molded therein. The index grooves cooperate with index means on the mounting bracket so that the mounting position of the meter may be easily changed with respect to the bracket. As shown in FIG. 2, the bracket 10 has index means including the retaining clip 11 and the index stud 12. FIG. 3 shows the meter mounted in the bracket. It will be appreciated that the meter can be mounted in any one of four alternate 90° mounting positions with respect to the bracket. Further, the resilient member, or retaining clip 11 can be easily deflected so that the meter can be mounted or its position changed without the use of tools.

In order to provide easy interchangeability of scales, the meter case is constructed with a raised portion 13. The scale 4 is a flat member conforming to the shape of the case 2 throughout at least a portion 16 of the periphery thereof. The remaining portion of the periphery is cut out to form tab portions 14 and 15. The shape of the scale cooperates with the shape of the case and the raised portion 13 to accurately position the scale with respect to the movement 1.

The meter of FIG. 1 includes the zero adjustment lever 21. The zero adjustment mechanism is of the type shown in U. S. Pat. No. 2,970,267, Pfeffer. In meters for use in industrial applications, it is desirable to have a concealed access to the zero adjustment. The reason for this is that an unskilled person may seriously change the meter calibration by unobvious change in the zero adjustment. Particularly in suppressed zero meters, the lever may be moved considerably without change in the zero position of the pointer.

In order to discourage change in the zero adjustment by unauthorized personnel, the access to the zero adjustment is in a concealed position. Access is by way of the threaded opening 22 located in one of the index grooves. A resilient screw 23 is threaded into the opening to provide a sealed closure of the opening.

In applications where corrosive gases and liquids, or dust and dirt and humidity are a problem, it is desirable to have the meter enclosed in a sealed case. These may be referred to as weatherproof meters. The need has long existed for a self-contained, integral one piece sealed meter with provisions for mounting directly to standard industrial conduit fittings.

In accordance with an important aspect of the applicant's invention, there is provided a weatherproof seal which can be opened without destroying the usefulness of the meter. The meter can thereafter be resealed. Further, the seal can be simply and reliably made with a minimum of rejects.

In accordance with another aspect, a zero adjustment can be made without breaking the seal.

Such a meter is shown in FIGS. 4, 5, 6 and 7. The meter includes the cup-shaped casing 24.

A meter movement is enclosed in the metal movement case 25. The movement drives the pointer 26 over the scale 28. The movement case 25, and scale 28, are permanently mounted on the casing 24. The scale 28 is affixed by two screws to the movement case 25. Bezel 27 has index grooves, the index grooves 29 and 30 being shown.

The meter leads 43 and 44 each terminate in a spring loaded, insulated shield encased, hand assembled, polarized connector. The male connector 45 and the female connector 46 are provided for connection of the meter into an electrical circuit without the use of tools. Since the connectors are polarized, it is impossible to connect the meter into the circuit improperly.

The meter may be mounted with the independently attached mounting fitting 49 shown in FIG. 5. The meter leads are brought out through a sealed opening in the case. The leads extend through the fitting 49 which is secured to the case by screws extending through holes 50 and 51 in the fitting. The screws are threaded into blind holes 52 and 53 in the case.

Figure 6:
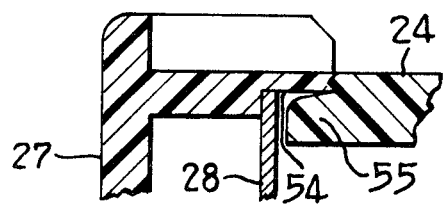
FIG. 6 shows the details of the seal between the case and the bezel.
Figure 7:
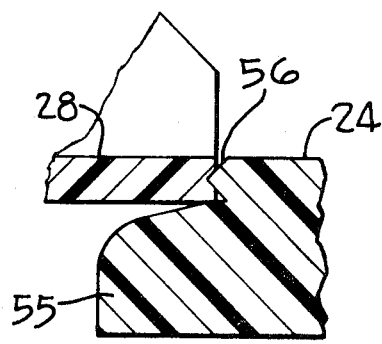
FIG. 7 is an enlarged view of a portion of FIG. 7.

The details of the seal are shown in FIGS. 6 and 7 which depict a cross-section of portions of the bezel 27 and the case 24. The bezel 27 has a step 54 cut into the rear circumferential edge of the bezel. The scale 28 abuts the vertical edge of this step. The case 24 has a raised annular ring portion 55 which forms a spigot joint with the bezel. The case also has a wedge shaped annular ring portion 56. The wedge shaped portion 56 abuts the rear circumferential edge of the bezel. The bezel is secured to the case so that contact is established only between the wedge shaped portion 56 of the casing and the rear circumferential edge of the bezel. The two may be secured together by the use of plastic solvent for example. Alternatively, plastic cement or various welding methods may be used.

In using solvent to make the seal, normally, the solvent will not flow inside the angular ring portion 56 and down the ring portion 55 so as to make a seal between the portion 55 and the bezel 28. That is, only the wedge shaped portion 56 is sealed to the bezel. This can be easily separated from the bezel by running a razor blade around the seal. The meter can thereafter be resealed.

Note that, if the ring portion 56 were not present, the solvent would flow down over the ring portion 55 and might join the inside surface of the bezel, the lower horizontal line of the bezel in FIG. 7, to the ring portion 55. This would produce a seal inaccessible to be cut cleanly when breaking the seal.

Before sealing the meter, it is desirable to include a dessicant material within the meter. Such a dessicant sealed within the meter prevents fogging of the transparent bezel from condensation of internal moisture. For example, dessicant capsules commercially available under the trade name Humi-Caps, Industrial Packaging Products Company, are suitable for use.

The weatherproof meter of FIG. 5 has the zero adjustment opening 22 and resilient closure 23 previously described in conjunction with FIG. 1.

While particular embodiments of the invention have been shown and described, it will be understood that various modifications may be made. The appended claims are, therefore, intended to cover any such modifications within the true spirit and scope of the invention.

What is claimed is:

1. A sealed electrical meter comprising:
   a meter movement energized by an applied electrical signal,
   a scale,
   a pointer driven over said scale by said meter movement,
   a plastic case enclosing said meter movement,
   a transparent plastic bezel having a step cut into the inner surface of the rear circumferential edge thereof,
   a raised annular ring portion on the edge of said case which fits inside said step in said rear circumferential edge of said bezel to form a joint with said bezel, and
   a wedge shaped annular ring portion on the edge of said case abutting the rear circumferential edge of said bezel, said bezel being secured to said case so that contact is established only between said wedge shaped portion and said rear circumferential edge.

2. The meter recited in claim 1 further comprising a desiccant material sealed within said meter to prevent fogging of said transparent bezel from condensation of internal moisture.

3. The meter recited in claim 1 wherein said meter leads for said movement are brought out through a sealed opening in said case, and an independently attached mounting fitting, said leads extending through said fitting, said fitting being secured to said casing by screws extending into blind holes in said case.

4. The meter recited in claim 1 wherein the energizing leads for said movement each have a spring-loaded, insulated shield encased, hand assembled, polarized connector thereon for connection of said meter into an electrical circuit without the use of tools.

5. The meter recited in claim 1 wherein said bezel has an opening therein, a seal plug inserted into said opening to provide a sealed closure of said opening, said opening providing a concealed access to the zero adjustment mechanism of said meter.

6. The meter recited in claim 1 wherein said case is sealed to said bezel by plastic solvent.

* * * * *